United States Patent [19]

Barth

[11] Patent Number: 4,906,090
[45] Date of Patent: Mar. 6, 1990

[54] SPECTACLE LENS FOR HALF-EYE SPECTACLES

[75] Inventor: Rudolf Barth, Vierkirchen, Fed. Rep. of Germany

[73] Assignee: Optische Werke G. Rodenstock, Munich, Fed. Rep. of Germany

[21] Appl. No.: 871,424

[22] PCT Filed: May 15, 1985

[86] PCT No.: PCT/DE85/00166
§ 371 Date: Apr. 21, 1986
§ 102(e) Date: Apr. 21, 1986

[87] PCT Pub. No.: WO86/01911
PCT Pub. Date: Mar. 27, 1986

[30] Foreign Application Priority Data

Sep. 15, 1984 [DE] Fed. Rep. of Germany ....... 3433916

[51] Int. Cl.⁴ ............................................. G02C 7/06
[52] U.S. Cl. .................................................. 351/169
[58] Field of Search ............... 351/169, 168, 170, 171, 351/172

[56] References Cited

U.S. PATENT DOCUMENTS 4,315,673  2/1982  Guilino et al. ....................... 351/169
4,592,630  6/1986  Okazaki ................................ 351/169

FOREIGN PATENT DOCUMENTS 0032121  4/1981  Japan ..................................... 351/169

Primary Examiner—Bruce Y. Arnold
Assistant Examiner—Terry S. Callaghan
Attorney, Agent, or Firm—Kalish & Gilster

[57] ABSTRACT

A spectacle lens for half-eye spectacles is described which in accordance with the present invention has at least one aspherical surface whose surface focal power increased progressively from the upper rim area of the spectacle lens towards the lens bottom.

In a preferred version example, the spectacle lens has a prismatic power of zero in the upper rim area.

In a further preferred version example, the power of the spectacle lens increases progressively from a value other than zero in the upper rim towards the lens bottom.

20 Claims, 4 Drawing Sheets

FIG. 1

| SAGITTA | | | | | | X(MM) | RADII (HORIZONTAL) | | | | | | | |
|---|---|---|---|---|---|---|---|---|---|---|---|---|---|---|
| 28 | 24 | 20 | 16 | 12 | 8 | 4 | 0 | Y(MM) | 0 | 4 | 8 | 12 | 16 | 20 | 24 | 28 |
| 5.997 | 4.471 | 3.155 | 2.071 | 1.261 | 0.732 | 0.449 | 0.363 | 8 | 95 | 83 | 66 | 58 | 63 | 79 | 94 | 84 |
| 5.829 | 4.306 | 2.993 | 1.914 | 1.106 | 0.578 | 0.294 | 0.207 | 6 | 94 | 83 | 66 | 59 | 63 | 78 | 93 | 84 |
| 5.708 | 4.186 | 2.878 | 1.805 | 1.000 | 0.470 | 0.183 | 0.094 | 4 | 92 | 82 | 67 | 60 | 64 | 78 | 91 | 83 |
| 5.637 | 4.112 | 2.811 | 1.748 | 0.948 | 0.413 | 0.117 | 0.024 | 2 | 87 | 80 | 68 | 62 | 65 | 77 | 87 | 81 |
| 5.616 | 4.087 | 2.796 | 1.747 | 0.951 | 0.409 | 0.099 | 0.000 | 0 | 81 | 77 | 69 | 66 | 68 | 75 | 81 | 78 |
| 5.649 | 4.114 | 2.831 | 1.794 | 1.002 | 0.452 | 0.130 | 0.025 | -2 | 76 | 75 | 71 | 69 | 70 | 73 | 76 | 75 |
| 5.736 | 4.196 | 2.916 | 1.884 | 1.095 | 0.540 | 0.211 | 0.103 | -4 | 74 | 73 | 72 | 71 | 71 | 73 | 74 | 74 |
| 5.879 | 4.336 | 3.055 | 2.023 | 1.233 | 0.676 | 0.344 | 0.235 | -6 | 73 | 73 | 72 | 72 | 72 | 72 | 73 | 73 |
| 6.083 | 4.534 | 3.250 | 2.216 | 1.424 | 0.865 | 0.532 | 0.422 | -8 | 73 | 72 | 72 | 72 | 72 | 72 | 72 | 73 |
| 6.346 | 4.791 | 3.502 | 2.465 | 1.670 | 1.109 | 0.775 | 0.664 | -10 | 72 | 72 | 72 | 71 | 71 | 72 | 72 | 72 |
| 6.671 | 5.109 | 3.813 | 2.772 | 1.973 | 1.410 | 1.075 | 0.964 | -12 | 72 | 72 | 71 | 71 | 71 | 71 | 72 | 72 |
| 7.058 | 5.487 | 4.184 | 3.137 | 2.335 | 1.768 | 1.431 | 1.320 | -14 | 72 | 71 | 71 | 71 | 71 | 71 | 71 | 72 |
| 7.509 | 5.927 | 4.616 | 3.562 | 2.755 | 2.185 | 1.846 | 1.734 | -16 | 71 | 71 | 71 | 70 | 71 | 71 | 71 | 71 |
| 8.024 | 6.430 | 5.109 | 4.048 | 3.235 | 2.661 | 2.320 | 2.207 | -18 | 71 | 71 | 70 | 70 | 70 | 70 | 71 | 71 |
| 8.605 | 6.997 | 5.665 | 4.595 | 3.776 | 3.197 | 2.854 | 2.740 | -20 | 70 | 70 | 70 | 69 | 69 | 70 | 70 | 70 |

SPECTACLE LENS FOR HALF-EYE SPECTACLES

BACKGROUND AND SUMMARY OF THE INVENTION

The present invention relates to half-eye spectacles.

Half-eye spectacles are spectacles where only that part of the spectacle lens is fitted into the spectacle frame which is not used for distance vision. With the known half-eye spectacles, spherical or toric single vision lenses are used where the "upper lens half" has simply been left off.

The optical power of the known half-eye spectacles is chosen in such a way that it will allow the spectacle wearer clear vision at short distances, i.e. at typical reading distances of about 40 cm. However, this means that the known half-eye spectacles have the disadvantage that they do not permit vision at intermediate distances, that is, for example, at distances of about one meter, with the accustomed visual comfort.

The object of the present invention is to provide half-eye spectacles which will also support visual accommodation in the intermediate area.

In accordance with this invention the focal power of the half-eye spectacle lens increases progressively from the upper rim area towards the bottom of the lens to that value which the spectacle wearer requires for near vision. At least one surface contributes to this increase in the focal power.

In an advantageous further development of the present invention, the prismatic power at the upper rim of the half-eye spectacles is zero so that no irritating image jump occurs when the gaze of the spectacle wearer is lowered (or raised) when he changes his visual direction from distance vision to near vision (or vice versa).

The power of the spectacle lens in the upper rim area may be 0 D. It is, however, particularly advantageous if the spectacle lens has a power other than zero in the upper rim area as the typical wearer of half-eye spectacles, an emmetropic presbyope, looks over the upper rim of the half-eye spectacles when looking into the distance. Only when his gaze is lowered, when he will typically want to see objects at medium visual distances, will the half-eye spectacle wearer look through the upper part of the progressive half-eye spectacles. Half-eye spectacles with a power other than zero in the area of their upper rim will then allow him clear vision for these finite distances, which the spectacle wearer can no longer manage alone through accommodation.

Furthermore, an upper rim area with power other than zero also has the advantage that it increases the "effective" addition of the spectacle lens—in contrast to the "surface theoretical" addition—by the value of the power in the upper rim area. This means that half-eye spectacles with an addition, i.e. with a difference between the power at the near reference point and the distance reference point (no longer present with half-eye spectacles) of 2 D and a power of 1 D in the upper rim area, will have the same power for the spectacle wearer as a surface with an addition of 3 D and a power of 0 D in the upper rim area. However, such a power of about 1 D is required by the emmetropic presbyope just for clear vision at infinite distances of about 1 m. In this way, he will find the corresponding powers on the surface of the half-eye spectacles for this distance and all short distances.

Nevertheless, the progressive surface of the half-eye spectacles still must only be calculated as if it had an addition of only 2 D. Such a surface with an addition of (for example) only 2 D has the advantage over a surface with an addition of (for example) 3 D that the progression corridor is wider: According to Minkwitz' proposition the width of the progression corridor (or the so-called progressive channel) is namely inversely proportional to the power increase.

Naturally both surfaces of the spectacle lens according to this invention for half-eye spectacles can contribute to the power increase from the upper rim area towards the lower portion of the lens. This is, however, of particular advantage if only one surface contributes to this power increase while the other surface has a spheric or toric design. In this way not only is an especially simple construction of the spectacle lens achieved, but it is, for example, also possible to have astigmatism correction.

In principle, any known progressive spectacle lens with the distance portion "cut off" can be used for the spectacle lens according to the present invention. One suitable, known progressive spectacle lens is, for example, described in the German DE-OS 28 14 916 (and explicit reference is herewith made to this publication with regard to all specifications, definitions, etc. not explained in detail here).

However, it is particularly advantageous if a progressive spectacle lens is used for the progressive spectacle lens in accordance with this invention as is described in the older German patent application (not published earlier) P 34 30 334. In this patent application, it is recognised that a progressive surface must inevitably show a certain amount of astigmatism. This astigmatism can either be concentrated in certain parts of the surface or be distributed more or less uniformly over the whole surface. In accordance with the present invention, it has now been recognized that a progressive spectacle lens particularly suitable for vision at close and intermediate distances can be obtained neither by distributing astigmatism uniformly over the surface, nor by transposing the astigmatism into the lateral lower rim areas and so into the progression zone; as in both cases the astigmatism, together with the increase in the surface focal power required in the progression corridor, will narrow the progression zone to only a narrow channel which permits clear vision. It has now been recognized that it is both required and possible for a progressive spectacle lens which permits clear vision primarily in the near and intermediate areas over a large part of the surface to transpose the main portion of surface astigmatism into a sector where the power practically does not increase. In this way, a progressive corridor is obtained which is largely free of astigmatism, comparatively wide and which permits clear vision in the intermediate area. If now the distance portion is selected as that area into which astigmatism is to be transposed, then a spectacle lens is obtained (as, of course, the distance portion is omitted for half-eye spectacles) which shows comparatively low astigmatism on all areas used and so offers optimum conditions for clear vision.

In a preferred version example of the spectacle lens for half-eye spectacles only one surface contributes to the power increase and this surface is designed in accordance with the older German patent application Ser. No. P34030 334; the distance portion, i.e. the area used for distance vision and so that area which is omitted with half-eye spectacles, has been selected as that area into which the main portion of astigmatism is transposed. For this reason, no compensation of the astigmatism which has been "pushed out" of the used area of the surface is necessary. As a result, it is also no longer necessary to give the second surface an aspheric design and so a purely spherical or toric surface can be used. By using a surface which contributes to the power increase in accordance with the German patent application Ser. No. P34 30 334, a progressive lens for half-eye spectacles is obtained which shows only low (unwanted) astigmatism in that area in which the power increases and which has practically no astigmatism in the reading portion.

Above all, however, the reading portion of this progressive surface is substantially larger than that of known progressive surfaces so that problem-free vision is possible over a large area "close-up" without any head movements. This progressive surface provided according to the present invention also has the following further advantage: As is known, emmetropic presbyopes show increased sensitivity to distortion. In addition, the typically much larger corneal vertex distance of half-eye spectacles has the effect of narrowing the lens areas which are free of aberration. With the conventional progressive lenses of the known designs this results in particularly the progressive channel being narrowed in such a way that it can hardly be used for clear vision. The progressive surface provided for in accordance with this invention with its new surface design is also a help here.

The surface of the spectacle lens in accordance with the present invention which contributes to the power increase (apart from the fact that it is designed in such a way so as to transpose the astigmatism into a certain area or certain areas) can have a similar construction to that of known lenses.

The calculation of the surface of the spectacle lens in accordance with the present invention for half-eye spectacles which contributes to the power increase can, as already stated in P 34 30 334.1, be done using periodic functions such as are given in DE-OS 28 14 916.

In addition, the surfaces which contribute individually to the power increase can also be put together piece by piece with a constant second derivative. Or surface properties can be pre-determined and the surfaces then calculated using Spline functions.

In this process, calculation procedures known per se can be used where first the progression corridor is optimised with no attention being paid to the surface properties of the distance portion.

The progressive spectacle lens in accordance with the present invention can also be designed without problems in such a way that in the progressive zone the lines of constant power are mainly horizontal. Reference is made to DE-AS 26 10 203 with regard to the advantages of such a course for the lines of constant power.

In addition, the progressive spectacle lens in accordance with the present invention has the surprising advantage that distortion is low.

The idea in accordance with the present invention of transposing the irritating surface astigmatism of a progressive spectacle lens into that area which is dispensed with for half-eye spectacles by means of mathematical methods permits extremely great freedom in design.

The main meridians of the surfaces which contribute to the power increase can be formed in a known fashion as umbilical lines or show astigmatism. It is, however, possible to compensate for this astigmatism as well as for any astigmatism which may be present in the progressive corridor by means of a counter-surface which also has an aspheric design.

The main meridians may be winding, i.e. the main meridian curves are not in one plane; the main meridian curves may, however, also be plane and the lens fitted into the spectacle frame in a rotated position.

Of course, it is also possible to calculate the spectacle lens according to the present invention which is provided with a winding main meridian, or which is fitted into a spectacle frame in a rotated position, in such a way that it is horizontally symmetrical in the fitted position.

It is, however, of particular advantage that the large reading portion which is practically free of astigmatism and the wide progression corridor in which clear vision is possible permit the lens to be fitted into the spectacle frame without rotation and without this resulting in any physiological impairments.

In this way a horizontally symmetrical lens is obtained without any great effort in the calculation process which could only be obtained with great effort in the calculation process when fitted in a rotated position or with a winding main meridian and which would also require the surfacing of so-called "left" and "right" lenses.

Surprisingly, it was found that such a progressive spectacle lens for half-eye spectacles will not only be accepted very well by emmetropic presbyopes, i.e. by persons who require no correction for distance vision, but also by presbyopes with slight vision impairments.

The surfaces described in the above-named older patent application Ser. No. P 34 30 334.0 are characterized in the progressive corridor by the fact that the course of the curvature radii of the so-called orthogonal sections deviates completely from that stated, for example, in the U.S. Pat. No. 2 878 721 or in DE-AS 20 44 639. In accordance with this older suggestion, the curvature radius of the orthogonal sections increases in the vicinity of the main meridian on the front surface and decreases on the back surface, while in the case of the spectacle lens described in patent application Ser. No. P 34 30 334.0 it decreases and increases respectively.

In any case, it is particularly advantageous if at the connection to that area in which the power increases progressively, the spectacle lens has an area of constant or practically constant power which should have a practically spherical design and therefore free of astigmatism. In addition, it is also possible to provide a reading portion with toric power for spectacle wearers with near astigmatism.

DESCRIPTION OF THE PREFERRED EMBODIMENTS

Figure 1:
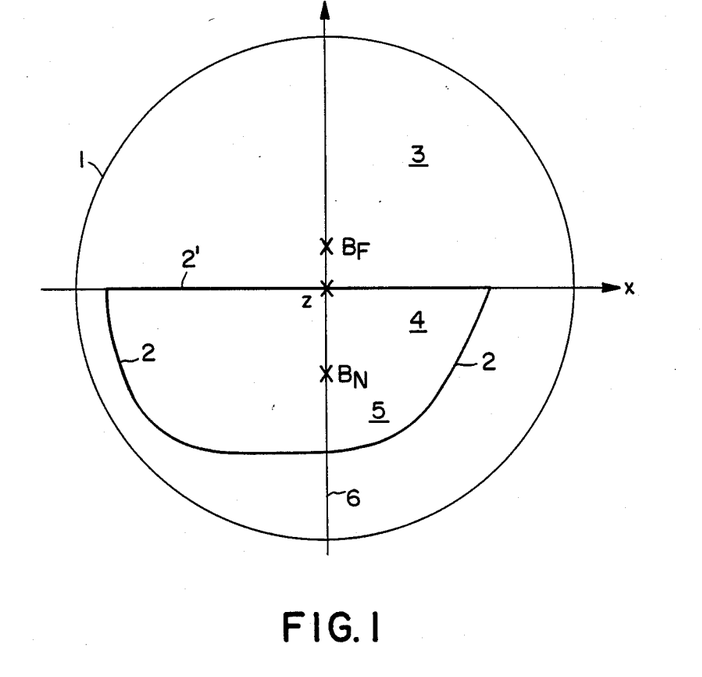
FIG. 1 shows in schematic form that part of a progressive spectacle lens used for half-eye spectacles embodying the invention.

To describe the basic design of a progressive spectacle lens for half-eye spectacles in accordance with the present invention, FIG. 1 character shows a top view of a version example. 1 designates a so-called uncut round lens, such as is, for example, used for full-view spectacles, and 2 designates the form of the half-eye spectacles. In the version example shown, the upper rim 2' of the half-eye spectacles runs through the geometrical center of the uncut round lens 1, i.e. only surface points with $y<0$ are present on the half-eye spectacles. The upper rim can, however, also have another course corresponding to the known fitting rules within the progressive corridor or region 3.

In the version example shown (without limiting the generality of the invention) the front surface is a progressive surface, i.e. its surface focal power increases from the distance portion 3 through the progressive corridor 4 to the reading portion 5. The back surface does not contribute to the power increase and can be a spherical or a toric surface.

$B_F$ and $B_N$ are the distance reference point and the near reference point respectively in accordance with DIN 58208, and are located on the main meridian 6.

In addition, the position of the Cartesian coordinate system which is used below is marked in FIG. 1 with the axes x, y and z.

Below, a numerically specific version example of the present invention is described in connection with FIGS. 2 to 5.

The version example in accordance with these figures possesses a progressive front surface whose surface focal power on the main meridian 6 increases from approximately 5.6 D to approximately 7.6 D, i.e. the so-called addition A is 2.0 D. (Refractive Index $n=1.525$). The back surface is (without limiting the generality of the invention) a spherical surface with a surface focal power of approximately $-5.6$ D. The calculation of the front surface is effected using the formulae shown in DE-OS 28 14 916.

Figure 2:
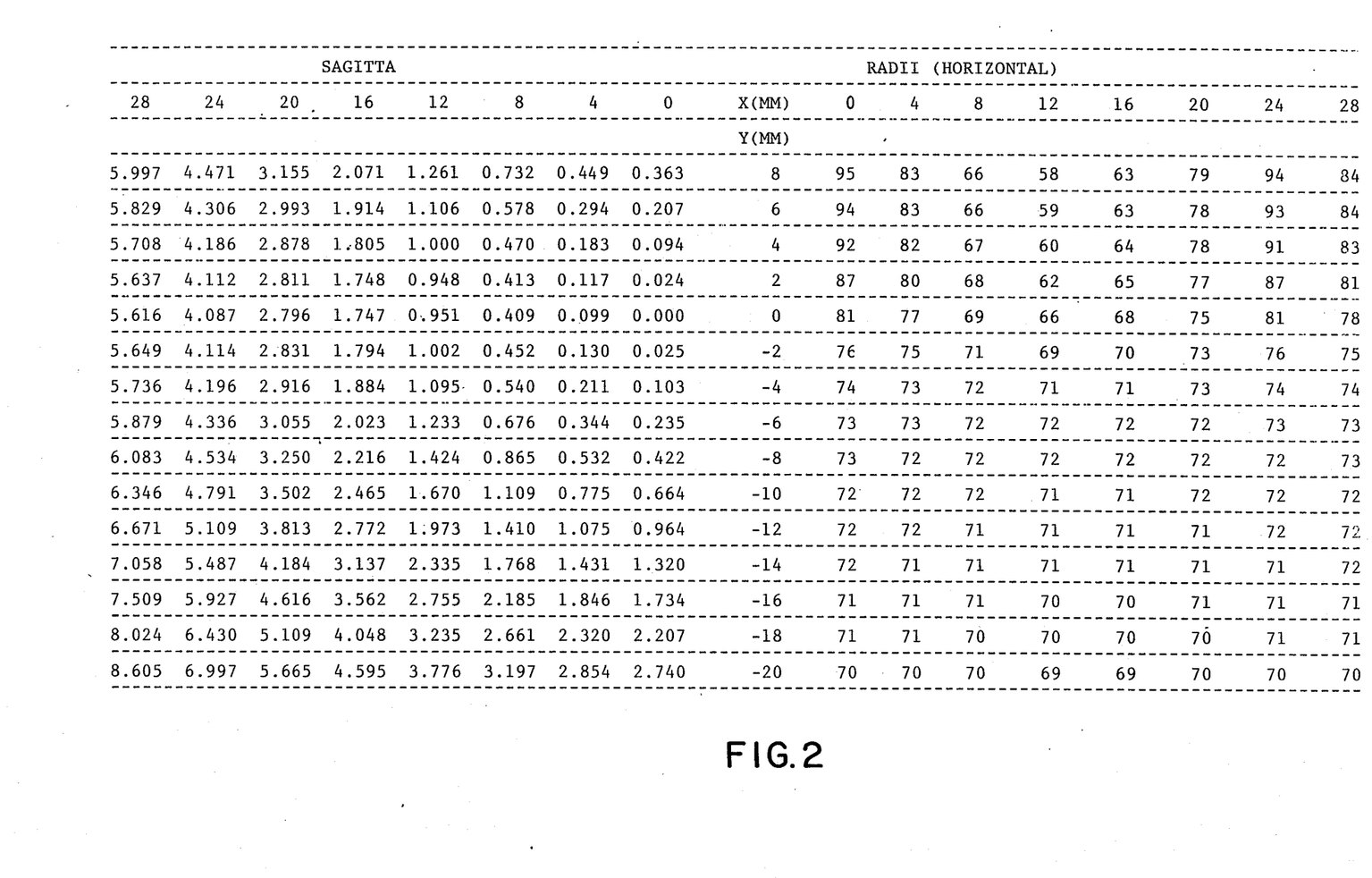
FIG. 2 shows in table form the sagitta and horizontal curvature radii of the surface which contributes to the power increase of a first version example of the present invention.

FIG. 2 shows a table where the lefthand part gives the sagitta p, i.e. the distance measured in the direction of the optical axis of a surface point (x,y) of the front surface from the vertex of the front surface. On the righthand side of the table the horizontal curvature radii for these surface points are given, i.e. the curvature radii of the intersection lines which are produced by the intersection of the plane parallel to the x/z plane with the progressive front surface.

In the version example shown, the main meridian 6 of the front surface is plane and is situated in the lens center (x=0). In addition, the main meridian is an umbilical line. (In the version example shown, the lens is, without limiting the generality of the invention, symmetrical to the main meridian.)

Figure 3:
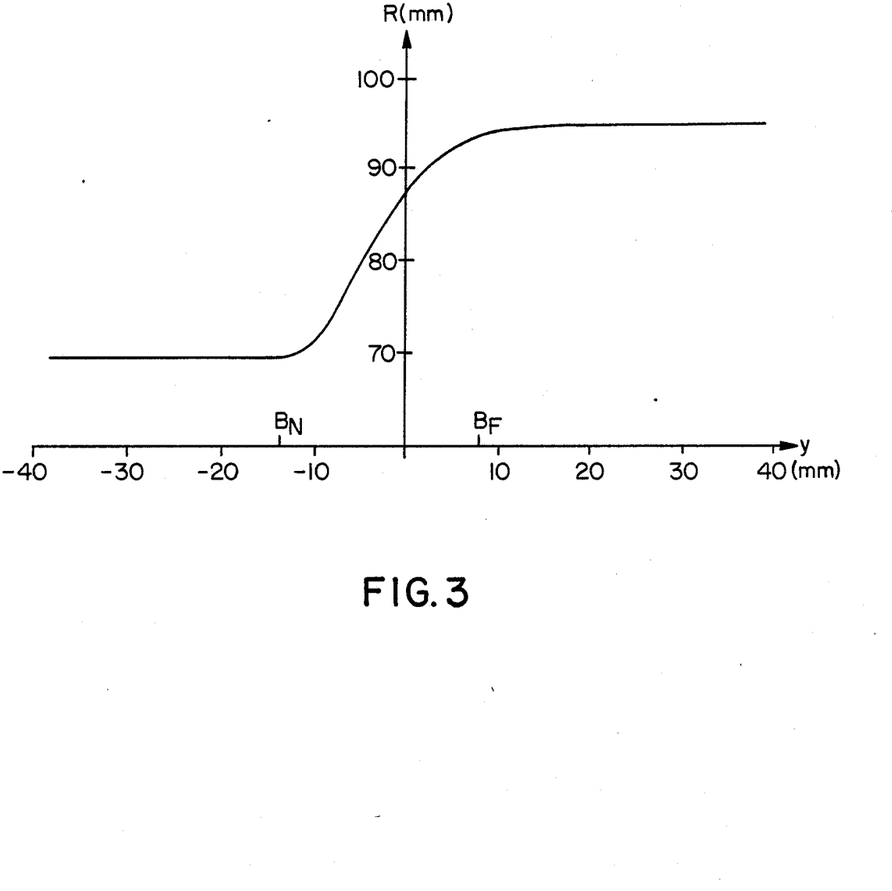
FIG. 3 shows the curvature radius R along the course of the main meridian in the version example in accordance with FIG. 2.

FIG. 3 shows the dependence of the curvature radius R of the main meridian on y for the version example shown. As can be seen, the surface focal power on the main meridian in the distance portion and the reading portion is practically constant and increases in the progressive corridor in a substantially linear manner from the value of the distance portion to the value of the reading portion.

Figure 4:
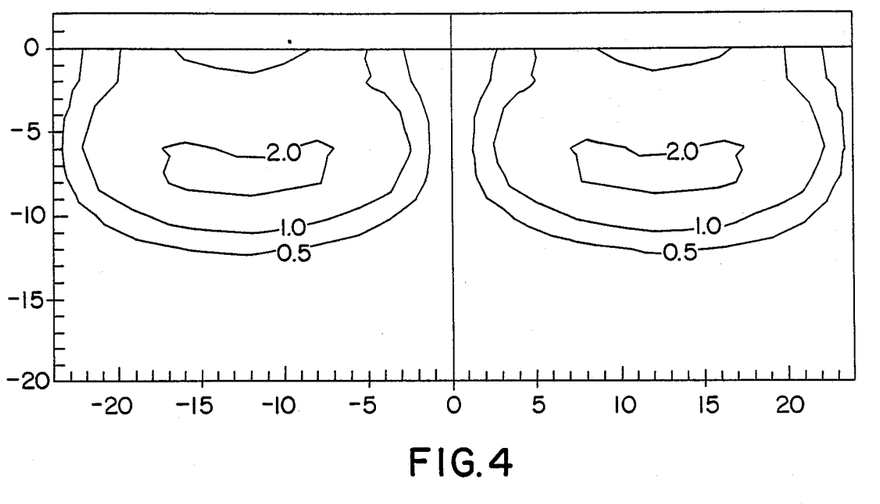
FIG. 4 lines of equal astigmatism of a progressive spectacle lens for half-eye spectacles where the front surface is defined in accordance with FIG. 2.

FIG. 4 shows the surface astigmatism of the front surface 1 in accordance with FIG. 2. The surface astigmatism in the distance portion (not shown) would be very high outside the main meridian. In the progression corridor, which extends approximately from $y=+6$ to $y=-14$, the surface astigmatism is comparatively small and very low in the large reading portion, i.e. less than 0.5 D.

With half-eye spectacles, where only the points of the surface with $y<0$ are present, the high surface astigmatism of the front surface in the "cut off" distance portion is not, however, irritating. But the large useful progression corridor 4 and the very large reading portion 5, which permits pleasant vision close-up without any head movements, have a positive effect.

Figure 5:
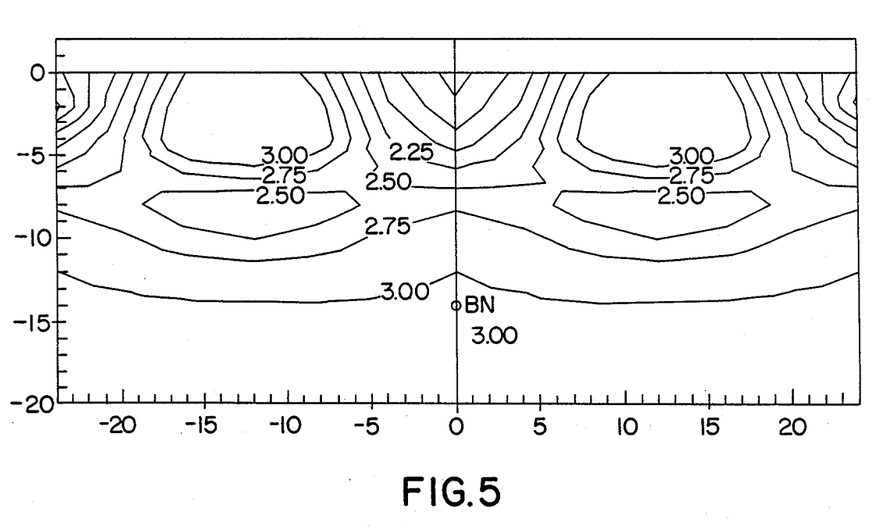
FIG. 5 the power lines of the spectacle lens in accordance with FIG. 4.

In addition it is very favorable that, as is shown in FIG. 5, the power lines in the progressive corridor and in particular in the vicinity of the main meridian run horizontally.

In the above, one version example of the present invention has been described. Within the central idea in accordance with this invention of producing progressive half-eye spectacles, a great number of different modifications are possible.

The upper rim of the half-eye spectacles need not necessarily be congruent with the surface center as in the version example shown. Rather the upper rim can be selected in agreement with the known fitting rules anywhere in the progressive corridor so that the spectacle wearer "just looks over the rim of the spectacles" when looking into the distance.

The progressive surface can also be the back surface. Naturally both surfaces may also have a progressive design.

In the case that only one surface has a progressive design, the other surface (in the version example shown, the back surface) need not necessarily be spherical or toric. It may also have an aspheric design, without contributing to the power increase.

An aspherical second surface which may or may not contribute to the power increase can, for example, have such a design that it at least partially compensates for the astigmatism in the progressive corridor with a surface in accordance with German patent application Ser. No. P 34 30 334.0.

The main meridians of both surfaces can be plane or winding; instead of an umbilical line as the main meridian, a line may also be used which shows at least partially defined astigmatism; if both surfaces contribute to the power increase, i.e. have a progressive design, one surface may show an umbilical line as the main meridian, while the main meridian of the other surface has a defined astigmatism.

In addition, the spectacle lens in accordance with the present invention can be manufactured from mineral glass, from plastic material or from glass with a refractive index gradient.

Accordingly, it is seen that the invention provides a spectacle lens for half-eye spectacles having front and rear surfaces and defining an upper rim, a near vision progressive corridor below the upper rim and a reading portion below the near vision progressive corridor. The lens defines a main meridian including a distance reference point above the upper rim and a near reference point below the upper rim, whereby there is a missing distance portion of the lens above the upper rim. At least one of said surfaces is aspherical and has a surface focal power which increases progressively from an upper rim area of the progressive corridor to a value in the reading portion which the wearer requires for near vision. The progressive corridor is largely free of astigmatism such that astigmatism is transposed into the missing distance portion, thereby providing a wide progressive corridor. According to one preferred aspect, the lens has a prismatic power of zero in the upper rim area. According to another aspect, the focal power of the lens increases progressively from a value other than zero in the upper rim area. It is preferred that only one of the surfaces, e.g., front surface, contribute to the focal power increase and that the other surface have spherical or toric design. In such a lens, it is most preferred that, in that area in which the surface focal power increases, the curvature radius of the lines of intersection of planes orthogonal to the main meridian with such aspherical surface decrease on the front surface at least in the vicinity of the main meridian and increase on the back surface. Further preferred aspects are that the lens have substantially constant focal power in its lower area, and that either surface contributing to the power increase have a substantially spherical design in that area having constant power. A lens of the invention may have at least one of the two surfaces in a cylindrical coordinate system $(y, \rho \phi)$ which satisfies the following equation:

$$\rho(\phi, y) = \sum_{n=0}^{\infty} a_n(y) * \cos(n\, k(y)\phi)$$

where $a_n(y)$ have been selected in such a way that $\rho(o, y)$ describes the curve $f(y)$ of the main meridian, $k(y)$ is a function which varies from the reading portion (5) to the cut-off distance portion (3), and which preferably either increases monotonically in the range of values of 3 to 10 or is a constant number over the whole surface, preferably in the range of values of from 3 to 10, and where the curvature $F(y) = f'(y)/(1 + f'^2(y))^{3/2}$ of the main meridian satisfies the equation $$F(y) = A*(1 - (1 + e^{-c(y+d)})^{-m})$$

where $A = \overline{D}_N - \overline{D}_F$, $\overline{D}_N$ and $\overline{D}_F$ being respectively the mean surface focal power in the reading portion (5) and the distance portion (3). Numbers c, d and m can be chosen according to applicant's prior U.S. Pat. No. 4,315,673. The origin of the cylindrical coordinate system is established afresh for each horizontal section.

I claim:

1. A spectacle lens for half-eye spectacles, the lens having a front surface and a rear surface facing the eye and defining an upper rim, at least the front surface having a progressive zone below the upper rim and a reading portion below the progressive zone, the lens defining a main meridian including a distance reference point above the upper rim and a near reference point below the upper rim, the lens focal power increasing progressively from an area of the upper rim along the main meridian to a value in the reading portion which the wearer requires for near vision, said front surface being aspherical and having a surface focal power which contributes to the increasing focal power, the radius of curvature for said front surface of lines formed from the intersection of planes orthogonal to the main meridian decreasing throughout the entirety of the progressive zone with increasing distance from the main meridian at least in a region surrounding the main meridian.

2. A spectacle lens for half-eye spectacles as set forth in claim 1 wherein in the area of the upper rim, the lens has a prismatic power of zero.

3. A spectacle lens for half-eye spectacles as set forth in claim 1 wherein, in the area of the upper rim, the lens has a focal power which increases from a value of greater than zero.

4. A spectacle lens for half-eye spectacles as set forth in claim 1 wherein only one of said front and rear surfaces contributes to said progressive increase in focal power.

5. A spectacle lens for half-eye spectacles as set forth in claim 14 wherein the other of said surfaces is spherical.

6. A spectacle lens for half-eye spectacles as set forth in claim 4 wherein the other of said surfaces is torical.

7. A spectacle lens for half-eye spectacles as set forth in claim 1, the lens having a lower region including said near reference point, the focal power in said lower region being substantially constant.

8. A spectacle lens for half-eye spectacles as set forth in claim 7, said one of said front and rear surfaces which contributes to said progressive increase in focal power of the lens being substantially spherical in said lower region.

9. A spectacle lens for half-eye spectacles as set forth in claim 1 wherein at least one of the two surfaces satisfies, in a cylindrical coordinate system $(y, \rho, \phi)$, the following equation:

$$\rho(\phi, y) = \sum_{n=0}^{\infty} a_n(y) * \cos(n\, k(y)\phi)$$

where $a_n(y)$ have been selected in such a way that
$\rho(\phi, y)$ describes the curve $f(y)$ of the main meridian,
$k(y)$ is a function which varies from the reading portion to the missing distance portion, and which either increases monotonically preferably in the range of values of 3 to 10 or is a constant number over the whole surface, preferably in the range of values of from 3 to 10,
and where the main meridian exhibits a curvature $$F(y) = f'(y)/(1 + f'^2(y))^{3/2}$$

which satisfies the equation $$F(y) = A*(1 - (1 + e^{-c(y+d)})^{-m})$$

where $A = \overline{D}_N - \overline{D}_F$, and $\overline{D}_N$ and $\overline{D}_F$ are respectively the mean surface focal power in the reading portion and the distance portion if present.

10. A spectacle lens for half-eye spectacles as set forth in claim 9 wherein the origin of the cylindrical coordinate system is established afresh for each horizontal section.

11. A spectacle lens for half-eye spectacles, the lens having a front surface and a rear surface facing the eye and defining an upper rim, at least the rear surface having a progressive zone below the upper rim and a reading portion below the progressive zone, the lens defining a main meridian including a distance reference point above the upper rim and a near reference point below the upper rim, the lens focal power increasing progressively from an area of the upper rim along the main meridian to a value in the reading portion which the wearer requires for near vision, said rear surface being aspherical and having a surface focal power which contributes to the increasing focal power, the radius of curvature for said front surface of lines formed from the intersection of planes orthogonal to the main meridian increasing throughout the entirety of the progressive zone with increasing distance from the main meridian at least in a region surrounding the main meridian.

12. A spectacle lens for half-eye spectacles as set forth in claim 11 wherein in the area of the upper rim, the lens has a prismatic power of zero.

13. A spectacle lens for half-eye spectacles as set forth in claim 11 wherein in the area of the upper rim, the lens has a focal power which increases from a value of greater than zero.

14. A spectacle lens for half-eye spectacles as set forth in claim 11 wherein only one of said front and rear surfaces contributes to said progressive increase in focal power.

15. A spectacle lens for half-eye spectacles as set forth in claim 14 wherein the other of said surfaces is spherical.

16. A spectacle lens for half-eye spectacles as set forth in claim 14 wherein the other of said surfaces is torical.

17. A spectacle lens for half-eye spectacles as set forth in claim 11, the lens having a lower region including said near reference point, the focal power in said lower region being substantially constant.

18. A spectacle lens for half-eye spectacles as set forth in claim 17, said one of said front and rear surfaces which contributes to said progressive increase in focal power of the lens being substantially spherical in said lower region.

19. A spectacle lens for half-eye spectacles as set forth in claim 11 wherein at least one of the two surfaces satisfies, in a cylindrical coordinate system $(y, \rho, \phi)$, the following equation:

$$\rho(\phi,y) = \sum_{n=0}^{\infty} a_n(y) * \cos(n\ k(y)\phi)$$

where $a_n(y)$ have been selected in such a way that
$\rho(\phi, y)$ describes the curve of $f(y)$ of the main meridian,
$k(y)$ is a function which varies from the reading portion to the missing distance portion, and which either increases monotonically preferably in the range of values of 3 to 10 or is a constant number over the whole surface, preferably in the range of values of from 3 to 10, and where the main meridian exhibits a curvature $$F(y) = f''(y)/(1 + f'^2(y))^{3/2}$$

which satisfies the equation $$F(y) = A*(1 - (1 + e^{-c(y+d)})^{-m})$$

where $A = D_N - D_F$, and $D_N$ and $D_F$ are respectively the mean surface focal power in the reading portion and the distance portion if present.

20. A spectacle lens for half-eye spectacles as set forth in claim 19 wherein the origin of the cylindrical coordinate system is established afresh for each horizontal section.

* * * * *

UNITED STATES PATENT AND TRADEMARK OFFICE
CERTIFICATE OF CORRECTION

PATENT NO. : 4,906,090
DATED : March 6, 1990
INVENTOR(S) : Rudolph Barth

It is certified that error appears in the above-identified patent and that said Letters Patent is hereby corrected as shown below:

Col. 8, line 13, "14" should be --4--;

line 44, the formula should be replaced as follows:

$$\text{--}F(y)=f''(y)/(1+f'^2(y))3/2\text{--}$$

Col. 10 line 20, the formula should be replaced as follows:

$$\text{--}F(y)=f''(y)/(1+f'^2(y))3/2\text{--}.$$

Signed and Sealed this

Third Day of July, 1990

Attest:

HARRY F. MANBECK, JR.

*Attesting Officer*   *Commissioner of Patents and Trademarks*